United States Patent
Goldberg et al.

(10) Patent No.: US 6,906,537 B2
(45) Date of Patent: Jun. 14, 2005

(54) SYSTEM FOR CONTROLLING THE TEMPERATURE OF AN AIRCRAFT AIRFOIL COMPONENT

(75) Inventors: Joshua I. Goldberg, Woodbridge, CT (US); Randy P. Holbrook, Cedartown, GA (US)

(73) Assignee: Hamilton Sundstrand, Windsor Locks, CT (US)

(*) Notice: Subject to any disclaimer, the term of this patent is extended or adjusted under 35 U.S.C. 154(b) by 0 days.

(21) Appl. No.: 10/607,022

(22) Filed: Jun. 26, 2003

(65) Prior Publication Data

US 2004/0032270 A1 Feb. 19, 2004

Related U.S. Application Data

(60) Provisional application No. 60/404,341, filed on Aug. 19, 2002.

(51) Int. Cl.$^7$ .......................... B64D 15/12; H05B 1/02; G01R 27/08; G01K 1/14
(52) U.S. Cl. ...................... 324/721; 219/505; 219/490; 244/134 D; 374/141
(58) Field of Search ...................... 244/134 R, 134 A, 244/134 B, 134 C, 134 D, 134 E, 134 F; 324/715–718, 720–721; 340/580–584, 962; 219/50, 490, 494, 497, 505, 509, 510; 374/163, 189, 166, 141, 120, 208, 4, 5; 338/23, 25

(56) References Cited

U.S. PATENT DOCUMENTS

| | | | | |
|---|---|---|---|---|
| 4,277,672 A | * | 7/1981 | Jones ........................ 219/497 |
| 5,263,775 A | * | 11/1993 | Smith et al. ................. 374/134 |
| 5,790,026 A | * | 8/1998 | Lardiere et al. ............ 340/581 |
| 6,129,314 A | * | 10/2000 | Giamati et al. ......... 244/134 R |
| 6,227,492 B1 | * | 5/2001 | Schellhase et al. ..... 244/134 D |
| 6,330,986 B1 | * | 12/2001 | Rutherford et al. ..... 244/134 E |
| 6,500,266 B1 | * | 12/2002 | Ho et al. .................... 118/730 |
| 6,646,235 B2 | * | 11/2003 | Chen et al. ............... 219/444.1 |
| 6,753,513 B2 | * | 6/2004 | Goldberg et al. ........... 219/497 |
| 2004/0011770 A1 | * | 1/2004 | Strang et al. .......... 219/121.36 |

* cited by examiner

*Primary Examiner*—Anjan Deb
*Assistant Examiner*—Jeff Natalini
(74) *Attorney, Agent, or Firm*—Carlson, Caskey & Olds

(57) ABSTRACT

An airfoil temperature control arrangement includes a resistive heater element. A plurality of detectors allow a controller to gather resistance information at various intervals along the resistive heater element. Determining the resistance of the corresponding portions of the heater element allows the controller to utilize a known relationship between resistance and temperature for the material selected to make the resistive heater element. In one example, a nickel alloy or other material having a high coefficient of resistance is chosen to provide the controller with the ability to determine a temperature for each portion of the heater element. The determined temperature information is used, for example, to monitor whether any portion of the heater element has become delaminated from the airfoil surface.

23 Claims, 1 Drawing Sheet

SYSTEM FOR CONTROLLING THE TEMPERATURE OF AN AIRCRAFT AIRFOIL COMPONENT

CROSS REFERENCE TO RELATED APPLICATIONS

This application claims priority to U.S. Provisional Patent Application No. 60/404,341 filed Aug. 19, 2002.

FIELD OF THE INVENTION

This invention generally relates to controlling the temperature on a surface of an aircraft airfoil component. More particularly, this invention relates to monitoring and controlling the operation of a resistive heating element used to heat a surface on an airfoil component

DESCRIPTION OF THE PRIOR ART

One issue that is presented repeatedly on aircraft is the potential for ice formation on portions of the aircraft such as the wings. Conventional approaches include heating the wings to prevent ice formation or to shed ice that has already formed. Obviously, when the heating elements are not operating as desired, the potential for ice build up exists.

There are two basic approaches in the industry for heating airfoil components including bleed air systems and using electrical heating elements. Similar difficulties are experienced with either approach although the solutions to such problems are markedly different. Three basic problems that can occur is that heat is applied when it should not be, heat is not applied when it should be and that heat is unevenly applied even though heat is needed across the entire component. There are a variety of known solutions for addressing these situations when a bleed air heating approach is used.

In the electrical heating context, however, a different approach is needed. An electrical heating system that fails to operate as required typically is experiencing an electrical short or an open circuit within the heater, itself. Another possibility is for the electrical heating element to become delaminated from the surface of the airfoil that is supposed to be heated. Because of the size of a typical heating arrangement, detecting a short or open within the circuit does not adequately pinpoint the identification of a problem.

One approach at detecting specific areas of improper heater function is to use a thermal imaging camera passing along the airfoil surface to be heated. The images from the camera provide an indication of heated surfaces and cold spots if they occur. While this approach is useful while an airplane is on the ground, it provides no information during flight. Moreover, the time-consuming technique and the expensive equipment required make this approach less than ideal in many situations.

Another approach is to incorporate a temperature sensor into the lamination of the heated surface and bonded heater. The temperature sensor output provides an indication of heater operation. A major shortcoming of this approach is that only the location within the temperature sensor's detection range is measured. Temperature at other parts of the heater (and therefore the airfoil surface) are not discernable.

There is a need for an improved arrangement for adequately determining the operation of an electrical heating element used to control the temperature of an airfoil surface. This invention addresses that need while avoiding the shortcomings and drawbacks of the prior art.

SUMMARY OF THE INVENTION

In general terms, this invention is a device for controlling a temperature of an airfoil surface and monitoring the operation of the heating element.

According to one implementation of this invention a resistive heater element is secured to the airfoil surface so that the heating element is able to warm the surface as needed. A controller controls the operation of the heater element. A plurality of detectors are associated with corresponding portions of the heater element to provide the controller with information regarding the resistance of the corresponding portions. The controller uses the resistance information to determine a temperature of each of the corresponding portions. By monitoring the temperature of each of the portions, accurate information regarding the entire heating element becomes available to monitor the quality of operation of the heater element.

In one example, the resistive heater element comprises a nickel alloy or another material having a high co-efficient of resistance. Choosing a material with a known resistance-to-temperature profile provides a reliable source of information to the controller for monitoring operating temperatures.

A method of implementing this invention for controlling a resistive heater element that is used to control the temperature of an aircraft airfoil includes several steps. The resistive heater element receives power. The resistance of each of a plurality of portions of the heater element are determined. The determined resistances allow for determining a temperature of each of the heater element portions. Determining the temperature of the portions reveals the condition or quality of operation of the heater element.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
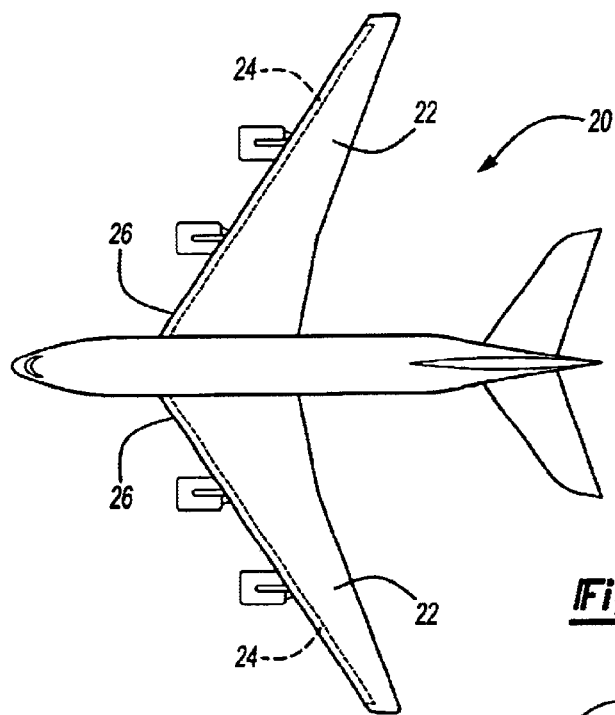
FIG. 1 schematically illustrates an aircraft incorporating a system designed according to this invention.

FIG. 1 schematically illustrates an aircraft 20 having wings 22. Electrical resistive heater devices 24 are supported on the body of the wings 22 near a leading edge 26. Although this description utilizes the wings 22 as example airfoil components incorporating a system designed according to this invention, the invention is not so limited. Those skilled in the art who have the benefit of this description will appreciate the use of this invention for a variety of airfoil components such as fins, propeller blades, etc. on a variety of aircraft, for example.

Figure 2:
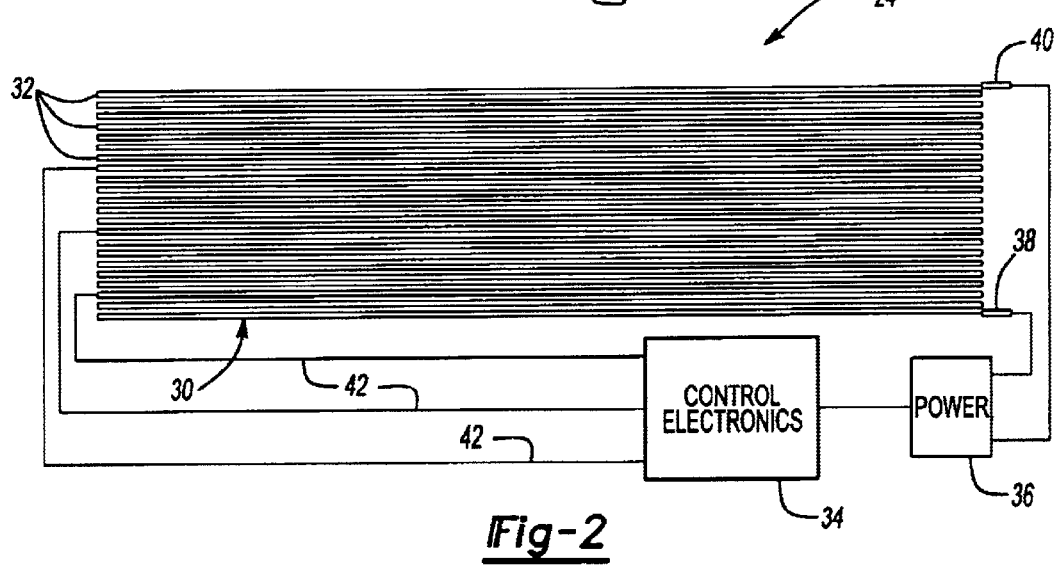
FIG. 2 schematically illustrates a heater element and associated electronic designed according to this invention.

The resistive heater devices 24 in this example each include a resistive heater element 30. As schematically shown in FIG. 2, the resistive heater element 30 may comprise a wound conductive wire or an etched foil layer that can be laminated onto a surface of the airfoil component using conventional lamination techniques. In the example of FIG. 2, the resistive heater element 30 includes a plurality of windings 32 of a conductive wire.

The resistive heater element preferably is made using a material having a high coefficient of resistance. Example materials useful in a device designed according to this invention include nickel alloys. One commercially available material that is believed useful in a system designed according to this invention is known as Alloy 120.

Control electronics 34 control the operation of the resistive heater element 30 by selectively coupling the resistive heater element 30 to a power supply 36 through leads 38 and 40. The control electronics 34 may comprise one or more microprocessors, for example. Those skilled in the art who have the benefit of this description will be able to select from among commercially available components or to suitably program a controller to meet the needs of their particular situation.

The material selected for the resistive heater element preferably has a relationship between resistance and temperature that is known. Suitably programming the controller 34 to utilize the known relationship between temperature and resistance allows the controller 34 to determine the temperature of the corresponding portions of the heater element 30. This provides a significant advantage in that the controller 34 is able to make temperature determinations for discrete portions of the heater element 30 without requiring additional temperature sensors or other cost-adding devices.

A plurality of detectors 42 are associated with the resistive heater element 30 so that the controller 34 is able to determine temperature information regarding the various portions of the resistive heater element 30. In the example of FIG. 2, the detectors 42 comprise wire leads that are coupled with selected portions of the wound coils 32 such that the controller 34 is able to determine a voltage in the area where the detectors 42 are coupled with the corresponding portions of the heater element 30. Because the controller 34 is aware of the current provided through the power supply 36, detecting the voltages allows the controller 34 to determine a resistance associated with each portion of the heater element 30. The controller 34 preferably is programmed to use known techniques for measuring the resistance of each portion.

A variety of connection strategies for coupling the detectors 42 with the heating element 30 may be used. In the illustrated example, the connections are schematically at one end to simplify the wiring used to make the connections.

The controller 34 in one example communicates with other electronics on the aircraft 20 to provide an indication that one or more of the portions of the heater element 30 is operating at a temperature that is outside of an acceptable range. The indication may be visible or audible within the cockpit of the aircraft, for example. In another example, the controller 34 has a suitable, conventional communication interface for providing the indication of undesirable operation of a portion of the heater element 30 to a mechanic or other aircraft technician.

Figure 3:
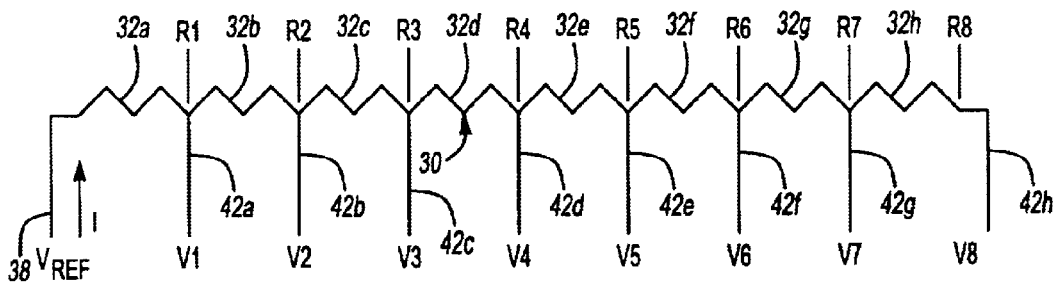
FIG. 3 schematically illustrates a technique for monitoring the operation of a heater element designed according to this invention.

Referring to FIG. 3, the heater element 30 is schematically illustrated as being divided up into eight portions. In the illustrated example, the wire is divided into portions 32A–32H. Eight detectors 42A–42H are associated with corresponding portions of the heater element 30 to provide an indication of a voltage at the location where the detectors are coupled with the conductive wire of the heater element. Because the controller 34 is able to determine the voltage at these locations, the controller 34 is able to determine the resistance of each portion of the heater element 30. Using a look up table or other suitable programming, the controller 34 then determines a temperature of each portion based upon the known relationship between resistance and temperature for the material chosen to make the heater element 30.

If at least a section of one of the portions of the heater element 30 becomes delaminated from the airfoil surface, that portion will be hotter than other portions and that temperature difference will be indicated by a different resistance for the corresponding portion. Choosing a suitable material allows for the level of resistance change detection as needed. Those skilled in the art who have the benefit of this description will be able to select an appropriate material to meet the needs of their particular situation.

An example use of a system designed according to this invention includes using detectors that are voltage sense taps chosen at equal distances along the heater element as schematically shown in FIG. 3, for example. When the resistances R1 through R8 are equal, the temperature across the entire heating element 30 is uniform. When an aircraft is on the ground and the system is initially energized, this condition is expected. If one portion or segment of the heater element is significantly hotter, that provides an indication that at least some of that section or portion of the heater element is partially delaminated from the airfoil surface. The higher resistance detected for that portion provides an indication of the higher temperature. Knowing the relationship between resistance and temperature for the chosen material and the configuration of the heater element allows the controller 34 to determine whether the temperature of that portion is outside of an acceptable range.

This invention includes the recognition that during flight, airflow cools different parts of the airfoil in different amounts. Accordingly, different degrees of cooling across the airfoil surface may be experienced and the controller 34 preferably is programmed to accommodate such expected variations in temperature across the heater element 30. Using empirical data, for example, the controller 34 can be suitably programmed to accommodate differing expected temperatures as a result of air speed, altitude, angle of attack, temperature, liquid water content and droplet median volume diameter, for example. Those skilled in the art who have the benefit of this description will be able to select the appropriate criteria to meet the needs of their particular situation.

Returning to the example of FIG. 3, assume a 0.4% per degree centigrade coefficient of resistance for the material of the heater element 30. In this example the heater element 30 is divided into eight zones, each including 12.5% of the total resistance for the heater element. When delamination (i.e., separation between the heater element and the airfoil surface) occurs, that section heats more rapidly than the laminated portions. Assuming 20% of one of the zones 32A–32H is delaminated, 2.5% of the total resistance of the heater will be detected for that zone or portion of the heater element. Further assume that the heater element heats at a nominal 10° C. per second. The delaminated portion heats at 20° C. per second. After five seconds, for example, the resistance has changed and can be calculated as $R_T=(0.8\times 10°\ C./sec+0.2\times 20°\ C./sec)\times 0.4\%/°\ C.\times 5\ seconds=24\%$. If there is no delamination, $R_T=10°\ C./sec\times 0.4\%/°\ C.\times 5\ seconds=20\%$. The difference between the 20% and 24% can be readily detected by conventional electronics allowing the controller 34 to make a determination that at least a portion of the heater element 30 is at least partially delaminated from the airfoil surface.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for controlling the temperature on an airfoil component, comprising:
   a resistive heater element;
   a controller that controls power supply to the resistive heater element;
   a plurality of detectors associated with corresponding portions of the resistive heater element at selected intervals along the heater element, the detectors providing the controller resistance information regarding the corresponding portions such that the controller determines a temperature of the corresponding portions based upon the resistance information.

2. The device of claim 1, wherein the resistive heater element comprises a material having a high coefficient of resistance.

3. The device of claim 2, wherein the resistive heater element comprises a nickel alloy.

4. The device of claim 1, wherein the resistive heater element comprises an elongated conductive wire and the detectors comprise voltage detection leads placed at selected intervals along the length of the wire and the controller determines a voltage at the location of each of the wire couplings and determines the resistance information based upon the determined voltage.

5. The device of claim 4, wherein the conductive wire comprises a nickel alloy material.

6. The device of claim 1, wherein the resistive heater element comprises an etched foil layer.

7. The device of claim 1, wherein the resistive heater element is laminated to a surface of the airfoil component and wherein the controller determines whether any portion of the heater element has become delaminated from the surface using the determined temperature or the corresponding portions.

8. The device of claim 1, wherein the resistive heater element is laminated on the airfoil component for heating at least a portion of the airfoil component.

9. An airfoil assembly, comprising:
   a component body having at least one surface;
   a resistive heater element secured to selected portions of the surface;
   a controller that controls operation of the resistive heater element;
   a plurality of detectors associated with corresponding portions of the resistive heater element, the detectors providing the controller resistance information regarding the corresponding portions such that the controller determines a temperature of the corresponding portions based upon the resistance information.

10. The assembly of claim 9, wherein the controller determines whether any one of the corresponding portions has become at least partially separated from the surface using the resistance information.

11. The assembly of claim 10, wherein the controller provides an indication that at least one of the portions has become at least partially separated from the surface.

12. The assembly of claim 9, wherein the resistive heater element is laminated to the surface.

13. The assembly of claim 9, wherein the resistive heater element comprises a material having a high coefficient of resistance.

14. The assembly of claim 13, wherein the resistive heater element comprises a nickel alloy.

15. The assembly of claim 9, wherein the resistive heater element comprises an elongated conductive wire and the detectors comprise wire couplings planed at selected intervals along the length of the wire and the controller determines a voltage at the location of each of the wire couplings and determines the resistance information based upon the determined voltage.

16. The assembly of claim 15, wherein the conductive wire comprises a nickel alloy material.

17. The assembly of claim 9, wherein the resistive heater element comprises an etched foil layer of a material having a high coefficient of resistance.

18. The assembly of claim 9, wherein the controller determines whether any one of the portions of the resistive heater element is not operating consistent with a desired operation and provides an indication that at least one of the portions is not operating as desired.

19. The assembly of claim 9, wherein the resistive heater element is secured to a selected portion of the surface for heating at least the selected portion of the surface.

20. A method of controlling a resistive heater element used to control the temperature on an aircraft airfoil component, comprising the steps of:
   supplying power to the resistive heater element;
   determining a resistance of each of a plurality of portions of the heater element;
   determining a temperature of each of the portions using the determined resistances; and
   determining whether the temperature of at least one of the portions is outside of an acceptable range.

21. The method of claim 20, wherein the heater element is laminated to a surface of the airfoil component and including determining whether at least one of the portions has become at least partially separated from the surface using the temperature information.

22. The method of claim 20, including providing an indication that at least one of the portions has a temperature that is outside of the acceptable range.

23. The method of claim 20, including heating a portion of the aircraft airfoil component that is associated with the resistive heater element.

* * * * *

UNITED STATES PATENT AND TRADEMARK OFFICE
CERTIFICATE OF CORRECTION

PATENT NO. : 6,906,537 B2  Page 1 of 1
APPLICATION NO. : 10/607022
DATED : June 14, 2005
INVENTOR(S) : Goldberg et al.

It is certified that error appears in the above-identified patent and that said Letters Patent is hereby corrected as shown below:

ON THE COVER PAGE, item (73) Assignee:

Please add --Engineered Fabrics Corporation, Rockmart, GA (US)-- after "Hamilton Sundstrand, Windsor Locks, CT (US)".

Signed and Sealed this

Twenty-fifth Day of December, 2007

JON W. DUDAS
*Director of the United States Patent and Trademark Office*